(12) United States Patent
Hebeisen et al.

(10) Patent No.: US 12,742,356 B2
(45) Date of Patent: Sep. 22, 2026

(54) PREVENTATIVE MAINTENANCE SYSTEM AND METHOD

(71) Applicant: Mechoshade Systems, LLC, Middleton, WI (US)

(72) Inventors: Stephen P. Hebeisen, Amawalk, NY (US); Xi Ming Liarno, Brooklyn, NY (US); Eugene Miroshnichenko, Oceanside, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 280 days.

(21) Appl. No.: 18/749,106

(22) Filed: Jun. 20, 2024

(65) Prior Publication Data

US 2024/0337154 A1 Oct. 10, 2024

Related U.S. Application Data

(63) Continuation of application No. 17/860,972, filed on Jul. 8, 2022, now Pat. No. 12,037,848, which is a (Continued)

(51) Int. Cl.

*H02K 11/20* (2016.01)
*E06B 9/322* (2006.01)

(Continued)

(52) U.S. Cl.

CPC ................ *E06B 9/72* (2013.01); *E06B 9/322* (2013.01); *E06B 9/34* (2013.01); *G05B 11/011* (2013.01);

(Continued)

(58) Field of Classification Search

CPC ... E06B 9/72; E06B 9/322; E06B 9/34; E06B 2009/3265; E06B 2009/6818;

(Continued)

(56) References Cited

U.S. PATENT DOCUMENTS 3,675,023 A 7/1972 Kunke et al.
4,058,255 A 11/1977 Linder et al.

(Continued)

FOREIGN PATENT DOCUMENTS

DE 102014200359 7/2014
EP 2357544 8/2011

(Continued)

OTHER PUBLICATIONS

USPTO, Non-Final Office Action dated Jan. 6, 2022 in U.S. Appl. No. 16/796,490.

(Continued)

*Primary Examiner* — Muhammad S Islam

(74) *Attorney, Agent, or Firm* — SNELL & WILMER L.L.P.

(57) ABSTRACT

A motorized window shade system may comprise a shade tube in a pocket; a window shade attached to the shade tube; a motor configured to rotate the shade tube; an internal temperature sensor configured to measure a first temperature of the motor, an external temperature sensor configured to measure a second temperature of the pocket; and a controller configured to adjust a mode of the system from an override mode to an automated mode.

19 Claims, 2 Drawing Sheets

Related U.S. Application Data continuation of application No. 16/796,490, filed on Feb. 20, 2020, now Pat. No. 11,414,926.

(60) Provisional application No. 62/808,022, filed on Feb. 20, 2019.

(51) Int. Cl.
*E06B 9/34* (2006.01)
*E06B 9/72* (2006.01)
*G05B 11/01* (2006.01)
*E06B 9/326* (2006.01)
*E06B 9/68* (2006.01)

(52) U.S. Cl.
CPC ...... *H02K 11/20* (2016.01); *E06B 2009/3265* (2013.01); *E06B 2009/6818* (2013.01); *E06B 2009/6872* (2013.01)

(58) Field of Classification Search
CPC . E06B 2009/6872; E06B 9/42; G05B 11/011; H02K 11/20
See application file for complete search history.

(56) References Cited

U.S. PATENT DOCUMENTS 4,621,615 A 11/1986 McGee
4,879,497 A 11/1989 Meyer et al.
4,914,329 A 4/1990 Ottersbach
5,189,350 A 2/1993 Mallett
5,532,560 A 7/1996 Element et al.
5,663,621 A 9/1997 Popat
5,726,911 A 3/1998 Canada et al.
5,763,980 A 6/1998 Li
5,850,131 A 12/1998 Wolfer et al.
6,064,949 A 5/2000 Werner et al.
6,138,078 A 10/2000 Canada et al.
6,297,742 B1 10/2001 Canada et al.
6,529,135 B1 3/2003 Bowers et al.
6,628,029 B2 9/2003 Astegno
7,166,978 B2 1/2007 Carson et al.
7,290,847 B2 11/2007 Shirotori et al.
7,389,806 B2 6/2008 Kates
7,417,397 B2 8/2008 Berman et al.
7,486,038 B2 2/2009 Amagasa
7,607,478 B2 10/2009 Martinez et al.
7,921,898 B2 4/2011 Brioschi
7,927,307 B2 4/2011 D'Antonio et al.
7,977,904 B2 7/2011 Berman et al.
8,278,859 B2 10/2012 Sakai et al.
8,432,117 B2 4/2013 Berman
8,456,729 B2 6/2013 Brown et al.
8,571,719 B2 10/2013 Altonen et al.
8,941,343 B2 1/2015 Lipp et al.
8,950,461 B2 2/2015 Adams et al.
8,981,681 B2 3/2015 Malekpour
9,404,811 B2 8/2016 Beers et al.
9,447,635 B2 9/2016 Derk
9,447,636 B2 9/2016 Blair et al.
9,529,345 B2 12/2016 Cregg et al.
9,562,390 B2 2/2017 Hall et al.
9,752,383 B2 9/2017 Lundy et al.
9,834,983 B1 12/2017 Hall et al.
9,850,705 B2 12/2017 Dean et al.
9,890,587 B2 2/2018 Adams et al.
9,988,841 B2 6/2018 Hall et al.
10,969,737 B2 4/2021 Haruta et al.
11,414,926 B2 8/2022 Hebeisen et al.
2005/0287295 A1 12/2005 Papp
2006/0000558 A1 1/2006 Fennell
2006/0232234 A1 10/2006 Newman
2007/0114861 A1 5/2007 Bott et al.
2012/0261079 A1 10/2012 Chambers et al.
2013/0233496 A1 9/2013 Ogden et al.
2014/0345807 A1 11/2014 Derk
2015/0160626 A1 6/2015 Cregg et al.
2015/0284990 A1 10/2015 Hall et al.
2016/0017656 A1 1/2016 Adreon
2016/0047164 A1 2/2016 Lundy et al.
2016/0258209 A1 9/2016 Berman et al.
2016/0333638 A1 11/2016 Cascia
2017/0145740 A1 5/2017 Hall et al.
2017/0280910 A1 10/2017 Alcantara Talavera
2018/0016840 A1 1/2018 Hall et al.
2018/0181085 A1 6/2018 Gabriel et al.
2018/0187484 A1 7/2018 Hebeisen et al.
2019/0234131 A1 8/2019 Seadia
2020/0064456 A1* 2/2020 Xu ........................ G01S 13/765
2020/0393818 A1 12/2020 Zhang et al.
2021/0262275 A1* 8/2021 Demele ................. E05F 15/632
2021/0270123 A1 9/2021 Esberger et al.
2021/0363875 A1 11/2021 Chanpura et al.
2022/0205319 A1* 6/2022 Hall ........................ E06B 9/262

FOREIGN PATENT DOCUMENTS

WO WO2007006775 1/2007
WO WO2011020478 2/2011
WO WO2017134012 8/2017
WO WO2018029062 2/2018

OTHER PUBLICATIONS

USPTO, Notice of Allowance dated Jul. 6, 2022 in U.S. Appl. No. 16/796,490.
USPTO, Non-Final Office Action dated Oct. 18, 2023 in U.S. Appl. No. 17/860,921.
USPTO; Notice of Allowance dated Feb. 7, 2024 in U.S. Appl. No. 17/860,921.
USPTO, Notice of Allowance dated Apr. 30, 2024 in U.S. Appl. No. 17/860,972.
ISA; International Search Report and Written Opinion dated May 14, 2020 in Application No. PCT/US2020/019108.
ISA; International Preliminary Report on Patentability dated Mar. 19, 2021 in Application No. PCT/US2020/019108.

* cited by examiner 100
60
70
25
80
35
20
5
15
65
55
10
40
45
30

PREVENTATIVE MAINTENANCE SYSTEM AND METHOD

CROSS-REFERENCE TO RELATED APPLICATIONS

This application is a continuation of, claims priority to and the benefit of, U.S. application Ser. No. 17/860,972 filed Jul. 8, 2022 and entitled "ACCELEROMETER ON MOTOR TO PROACTIVELY IDENTIFY FAILURES." The '972 application is a continuation of, claims priority to and the benefit of, U.S. application Ser. No. 16/796,490 filed Feb. 20, 2020, now U.S. Pat. No. 11,414,926 issued Aug. 16, 2022 and entitled "MAINTENANCE AND OPERATION OF A WINDOW SHADE SYSTEM." The '490 application claims priority to and the benefit of, U.S. Provisional Appl. No. 62/808,022 filed on Feb. 20, 2019 and entitled "MAINTENANCE AND OPERATION OF A MOTORIZED WINDOW SHADE SYSTEM". All of the foregoing applications are hereby incorporated in their entirety by reference for all purposes.

FIELD

The disclosure generally relates to motorized window shade systems, and more specifically, to systems and methods for optimizing the operation and maintenance of motorized window shade systems.

BACKGROUND

As set forth in FIGS. 1 and 2, a window shade system 100 has many components and moving parts. In various embodiments, the window shade system 100 may include window shade fabric 5 that connects to a shade tube 10 at a first end of the window shade fabric 5, a hembar 15 at a second end of the window shade fabric 5 and a batten 20 between the first end and second end of the window shade fabric 5 to provide stiffening. A motor 25 may have a gear box 40 and the motor 25 may drive the shade tube 10 via a drive wheel 30 and a collar 35. Collar 35 is an adapter for interfacing with one end of the shade tube 10, wherein the collar 35 fits over a crown of the motor 25.

The window shade system 100 and/or its components may experience certain problems or issues. For example, the shade fabric 5 may "walk" toward or into the bracket 50 or fall off the shade tube 10. In particular, the brackets 50 may not be mounted evenly and/or the shade may not be level, so the fabric 5 may bunch toward one end of the bracket 50. Such bunching of the fabric 5 may cause vibration on the motor 25 and a drop-in the speed of rotation of the motor 25.

The hembar 15 is typically located in a fabric pocket at the lower end of the shade fabric 5 and the hembar 15 is configured to provide rigidity and weight (to keep the shade taut) to the end of the shade fabric 5. The hembar 15 allows the end of the shade fabric 5 to lay evenly above a window sill. The batten 20 may be inserted into a fabric pocket (e.g., horizontal pocket) in the shade fabric 5 and located between the ends of the shade fabric 5. The batten 20 is configured to stiffen the shade fabric 5. However, the batten 20 and/or the hembar 15 may exit the fabric pocket and contact the wall and/or bracket 50, or someone (e.g., child) may be holding the hembar while the shade is in operation. Moreover, the batten 20 and/or the hembar 15 may get caught against something while the shade fabric 5 is rolled up or rolled down. The batten 20 and/or hembar 15 may also impact the bracket 50.

The drive wheel 30 is typically located over the shaft 45 (that emanates from the motor 25) and is configured to engage the shade tube 10. However, the drive wheel 30 may come loose from the shaft 45. The shade tube 10 fits over a collar 35 at the head (or crown) of the motor 25. The collar 35 fits over a crown around the head of the motor 25. However, the shade tube 10 may loosen from the collar 35. In various embodiments, the motor 25 may possess an attachment to the bracket 50 on the drive end (motor end) using a motor lug. The motor lug is secured using a cotter pin to hold the motor 25 to the bracket 50 on one end of the shade assembly. The other end (idle end) of the shade assembly may possess an idle end pin which inserts inside a bearing on another bracket 50 on the idle end, in order to secure the idle end side of the shade assembly. However, an attachment at the head of the motor or the idle end bearing may come loose, if not positively locked (e.g., in response to the cotter pin loosening or disengaging). A center support or multi-band connector may include bearings that interface with two adjacent and inline shade bands enabling multiple shade bands to be driven by a common motor. However, such bearings may also loosen. Furthermore, the gears inside a gear box 40 may start to wear over time and/or a tooth on one of the gears may wear over time. Such wearing of components may result in undesired operation or safety issues.

A need exists to incorporate sensors and other tools to help reduce these problems, better track maintenance issues and improve the safety of window shade systems 100.

SUMMARY

In various embodiments, a motorized window shade system may comprise a shade tube in a pocket; a window shade attached to the shade tube; a motor configured to rotate the shade tube; an internal temperature sensor configured to measure a first temperature of the motor; an external temperature sensor configured to measure a second temperature of the pocket; and a controller configured to adjust a mode of the system from an override mode to an automated mode.

The controller may be configured to raise the window shade, in response to a reduction in solar radiation in the pocket. The controller may be configured to raise the window shade to a particular setting, based on a reduction in solar radiation in the pocket, solar angle and solar orientation. The controller may be configured to adjust the mode of the system from the override mode to the automated mode, in response to a time period. The controller may be configured to adjust the mode of the system from the override mode to the automated mode, in response to an event. The internal temperature sensor may be located within a gear box of the motor. The external temperature sensor may be located on an outside surface of the motor. The controller may adjust the first temperature of the motor to compensate for a degradation of the motor. The controller may adjust a threshold for sending a notification to compensate for a degradation of the motor. The controller may restrict activation of the motor, in response to the second temperature being above a threshold. The controller may raise the window shade to release heat around the motor, in response to the second temperature being above a threshold. The controller may compare the second temperature to a third temperature predicted from analyzing sky conditions to verify the third temperature.

The system may further comprise an accelerometer configured to acquire vibration data from at least one of a component of the window shade system or an environment around the window shade system. The system may further comprise an accelerometer in communication with the controller. The system may further comprise an accelerometer on a hembar, wherein the hembar is in the window shade. The system may further comprise an accelerometer, and wherein the controller adjusts a threshold for sending a notification about excessive vibration to compensate for a degradation of the motor. The system may further comprise at least one of an anemometer, a current detector, an encoder or a kill switch, in communication with the controller.

The controller may be configured to provide a notification, in response to a problem with the window shade system. The controller may be configured to provide a notification, in response to a problem with the window shade system, wherein the notification includes an error code and a serial number for the motor.

BRIEF DESCRIPTION OF DRAWINGS

The accompanying drawings, wherein like numerals depict like elements, illustrate exemplary embodiments of the present disclosure, and together with the description, serve to explain the principles of the disclosure. In the drawings.

DETAILED DESCRIPTION

Figure 1:
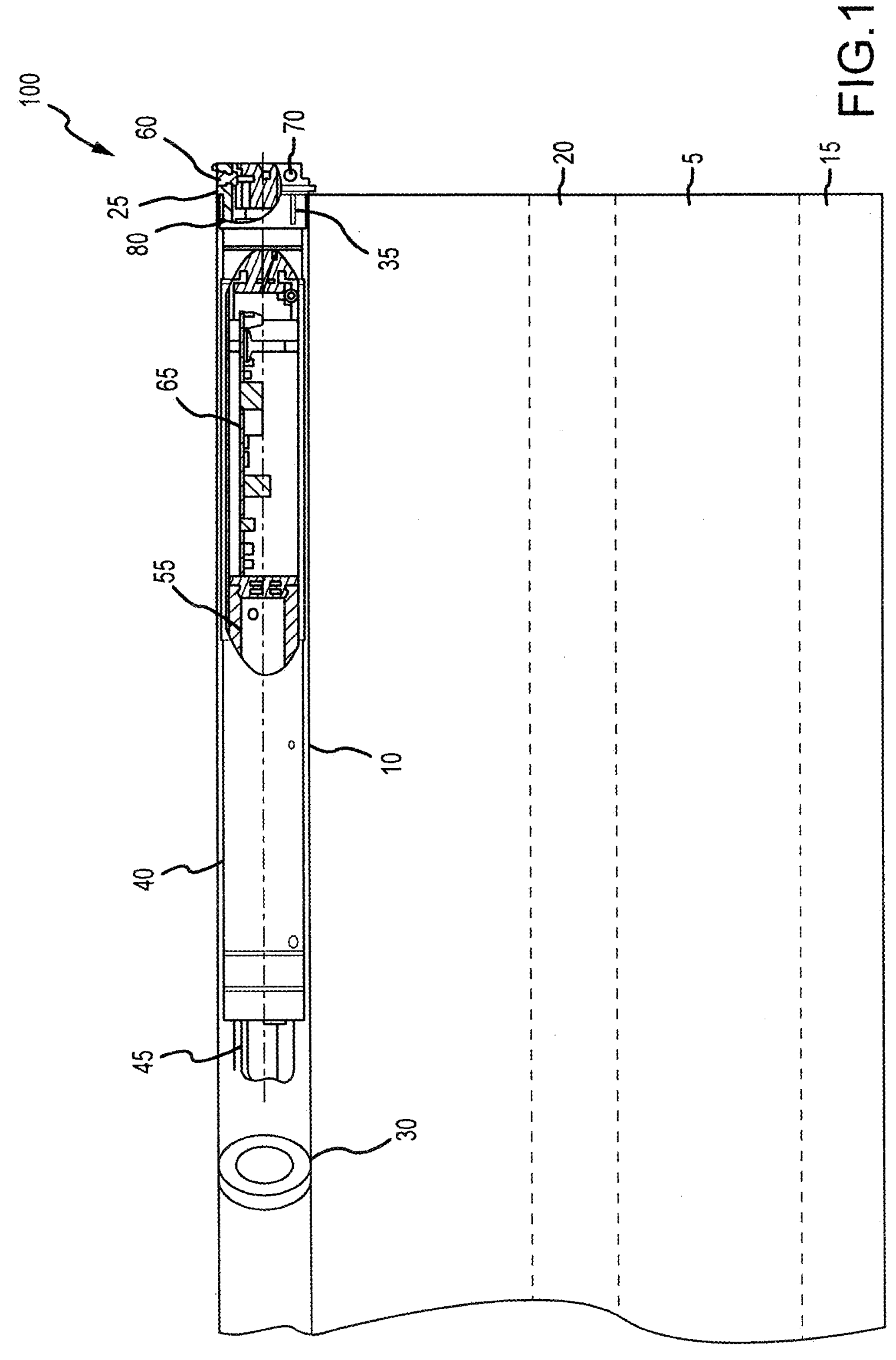
FIG. 1 is an exemplary motor inside a shade tube attached to a window shade fabric.
Figure 2:
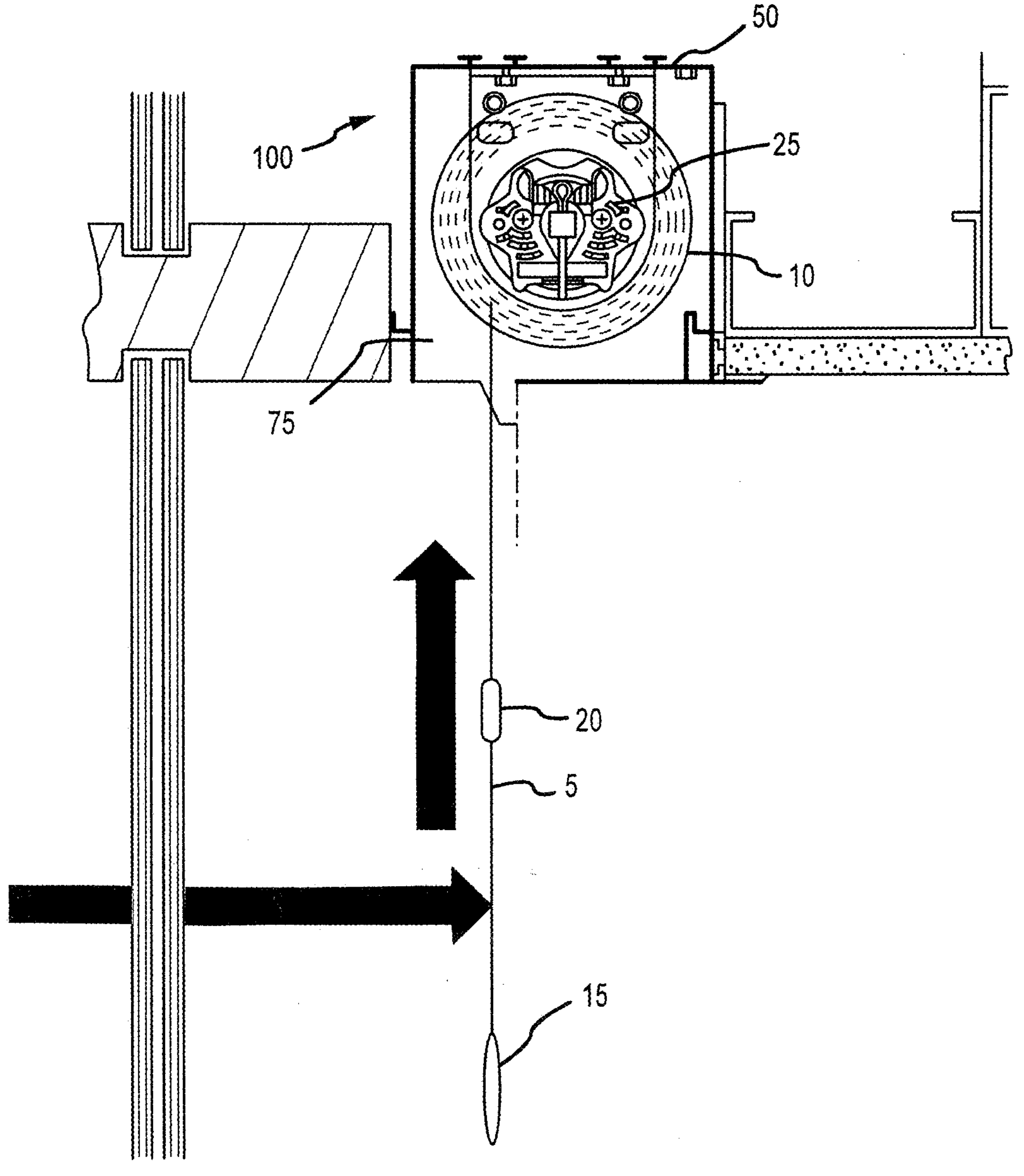
FIG. 2 is an exemplary window shade system (and its various components) installed in a pocket.

In various embodiments, as set forth in FIG. 1, the system may include or interface with one or more of temperature sensors 55, 60, an accelerometer 65, LED/re-set switch 70, a current detector, an encoder 80, an anemometer and/or a messaging system. In various embodiments, the current detector may be located anywhere in, around or remote from the window shade system. For example, the current detector may be located on the power input side of the control board (near accelerometer 65), inline with the driver for the DC motor, and/or outside the motor but communicating the current consumption of the motor to the control card. The system may include a control board having DC power regulation, a microprocessor for control, a driver for a DC motor 25, an encoder 80, an internal temperature sensor 55 and other circuitry depending on the processing technology and other inputs or communication technology applied with the motor. The control board may interface with a motor 25, a communication cable, a power cable, an accelerometer 65, temperature sensors 55, 60, a first PCB card for connecting to external features including a push button (e.g., re-set switch) and LED 70 (for interface by an installer), as well as an external temperature sensor 60. The control board may also include a second PCB card for access to and providing modular communication technology (e.g., RF, Ethernet, etc.) and/or adding more processing capability. The system may include a manual window shade system 100 (e.g., that may provide notifications to users to perform manual adjustments) or a motorized window shade system 100.

Prior art systems adjust the window shade down to restrict the daylight and/or heat gain from entering the room, in response to detecting increased light or a temperature change increase. Prior art systems also adjust the window shade up, in response to, for example, detecting a temperature change decrease (or to allow the sun to enter the room, to allow more light to enter the room, or to maximize the view from the window). If heat gain or too much daylight exists in a room again (after the automated system raises the shade), a user may override a window shade control system to manually lower a shade. However, after the heat gain stops, the user often does not adjust the shade again, so the shade stays down unnecessarily (while restricting daylight). After the heat gain stops, the reason for the override no longer exists, so the system should revert back to automation. However, most systems just stay in override mode.

In the present system, solar radiation (or reflected light) may go through the window and hit the shade fabric 5, causing heat gain to rise into a shade pocket 75. The shade pocket 75 holds the window shade system 100 and is typically between a headrail and a window. An external temperature sensor 60 may determine the solar radiation on the facade by detecting the heat gain from the heat that rises into the pocket 75, after the heat enters the space between the window and the lowered shade. At another time, the present system may determine that the heat is reduced (e.g., after the solar radiation leaves the window area), so in various embodiments, the automated system may remove the override condition, and go back to automated mode to raise the shade to allow more daylight back in again. As such, prior art systems adjust the window shade, in response to detecting a temperature change, while the present system adjusts the mode of the automated system from override mode to automated mode, in response to detecting a temperature change. After converting to automated mode, the present system may provide general instructions to fully or partially (e.g., at preset intervals) raise or lower the window shade. With additional input about location, orientation, solar angle, etc., the system may provide instructions for more precise and strategic window shade movements.

In various embodiments, the system may automatically switch to automation, in response to an event or in response to a time period. For example, the system may switch to automation in response to the expiration of a 12-hour time period, increased occupancy of a building, increased use of electricity in the building (air conditioning, lights, etc.) or a change in situation (change in day, change in weather, change of season, etc.). Furthermore, the system may switch to automation at 7:00 pm after most people leave a building, so the next day starts in automation.

More specifically, the temperature sensors may include a first temperature sensor 60 that obtains the temperature in the pocket 75 and a second temperature sensor 55 that obtains the temperature of the motor 25. The first temperature sensor 60 and the second temperature sensor 55 may be the same temperature sensor, different sensors, interfacing sensors or any other types or arrangement of sensors. The temperature sensors 55, 60 may include a thermometer, thermistor, etc. In various embodiments, the first temperature sensor 60 may be considered an external sensor (e.g., external the motor 25 and gear box 40) that is configured to measure the temperature inside the pocket 75. The second temperature sensor 55 may be considered an internal sensor (e.g., inside the gear box 40) configured to measure the temperature associated with the motor 25.

When analyzing the temperature, the system may conduct a lifecycle analysis of the motor 25. In particular, a motor 25 has a pattern and efficiency, so when the motor 25 is new, a maximum temperature (e.g., 240F degrees under maximum load), a base amplitude, a base frequency, a base vibration and/or pattern of vibration may exist. Over time, a motor 25 typically may increase in efficiency, but the motor then becomes inefficient from, for example, the break-down of the insulation, grease, oil, gears, wires, etc. Due to these deteriorations of the motor 25, the base motor 25 conditions may become hotter (e.g., 250F degrees) and emanate more heat. Moreover, the amplitude of vibration may increase, the frequency may change and/or the pattern of vibration may change. As such, the system compensates for such changes, and adjusts (increases) the base operating parameters for analyzing if a problem exists. In other words, the system may determine that a temperature reading from the internal temperature sensor 55 should be reduced to compensate for the extra heat from the motor 25. For example, the system may not activate an alarm signal from a higher temperature because the system knows that the older motor 25 now operates at the higher temperature during normal operation.

Furthermore, the system may perform preventative maintenance by using the internal temperature sensor 55 and the external temperature sensor 60 together to better analyze system issues. In that regard, the system may compare the motor 25 temperature to the pocket 75 temperature. The internal temperature around motor 25 is dependent on the ambient temperature surrounding the motor 25 in the pocket 75. Therefore, as the motor 25 starts, a thermal rise of heat exists around the motor 25 such that the motor 25 is operating in an environment of increased temperature. For example, if a motor 25 is mounted in a skylight, then the pocket 75 temperature may increase the initial ambient temperature around the motor 25 (e.g., an extra 100F degrees). However, such excess heat around a motor 25 may cause damage to a motor 25. As such, the system may prevent the motor 25 from operating when the ambient heat is getting too high such as, for example, in response to the pocket 75 temperature being outside of the operating parameters of the motor 25 (e.g., over 150 F degrees). To help reduce the heat around the motor 25, the system may raise the window shade to release the heat from the pocket 75 and dissipate some of the heat around the motor 25.

The system may also be used to verify the operations of an automated system. In particular, an automated system may analyze sky conditions to determine when direct heat is on a façade or when direct heat is expected to be on a facade. Temperature sensors outside of a building may determine the actual heat gain on the facade. The heat gain determined by the temperature sensors outside of the building may be compared to the heat gain determined by the automated system using the temperature sensors 55, 60 (internal to the motor 25 and in the pocket 75) to provide a closed loop verification of the accuracy of the automated system. The temperature sensors outside of the building may also communicate the measured heat gain to the automated system, so the automated system knows that that heat gain should exist.

The system may also include an accelerometer 65 interfacing with, or located on, any component in the system. In various embodiments, the accelerometer 65 may be located in the gear box 40 of motor 25. The accelerometer 65 may detect a vibration problem or acquire vibration data about any component of the system. For example, the accelerometer 65 may help to detect a faulty motor 25, drivetrain problems, problems with the shade assembly, problems with the batten 20, problems with the hembar 15, seismic activity, interference with the hembar 15 or window shade (e.g., someone improperly pulling on the hembar 15), etc. The batten 20 may loosen or leave its fabric pocket within the window shade and impact the wall, bracket 50, motor 25 or other component.

The hembar 15 may tilt to one side or the other (e.g., due to the wind) or may impact some item in its path (e.g., a stack of books). Such hembar 15 disruptions may only cause the window shade to buckle, but the hembar 15 disruptions may not be detected by the motor 25, or the disruptions may not impact the operation of the motor 25. Therefore, an accelerometer 65 located on the motor 25 may not detect such hembar 15 disruptions. As such, to better detect such hembar 15 disruptions, the accelerometer 65 may be incorporated into the hembar 15, externally attached to the hembar 15, or any other location where the accelerometer 65 can be configured to detect a disruption of the hembar 15.

While prior art systems in other industries may include accelerometers to detect vibration problems, the present system incorporates an accelerometer 65 into a window shade system 100 to proactively identify potential failure situations. In various embodiments, the system proactively identifies potential failure situations before the failure occurs and mitigates the failure situation or sends out a notification about the failure situation. The notification may include, for example, activating an alarm, providing a visual indicator, providing a signal to another system, providing a notice via a messaging system, sending a notice to a smart phone, sending a notice to a building management system and/or the like.

In various embodiments, the system may detect the beginning and end of the movement of the motor 25 when adjusting a window shade. The system may set a top limit and a bottom limit, then the system saves data about the motor 25 vibrations (frequency and amplitude data) through the entire process to create a signature or base line for the operation of the motor 25 while adjusting the window shade fabric 5. Afterwards, if the system detects vibrations that deviate from the base line vibrations, then system may send a notification.

As mentioned, the system may conduct a lifecycle analysis of the motor 25. In particular, a motor 25 has a pattern and efficiency, so when the motor 25 is new, a base amplitude, frequency and/or pattern of vibration may exist. Over time, motor 25 typically becomes inefficient from, for example, the break-down of the insulation, grease, oil, gears, wires, etc. Due to these deteriorations of the motor 25, the amplitude of vibration may increase. In various embodiments, the system may analyze vibrations and determine that the vibrations may be beyond the normal motor 25 vibrations. The system may determine that the vibrations may be from damage to one or more components, improper operation of one or more components, an earthquake, settling of the building and/or other issues. In response, the system may send a notification to a maintenance team to check the integrity of the components. For example, the rotating tube assembly may become partially or fully loose and impact one or more of the catchpins. Moreover, a lug on motor 25 may be received into a C-shaped connector, then a cotter pin is inserted through both components. If the cotter pin becomes loose or falls out, then the lug would disengage from the connector. Furthermore, the window shade fabric 5 may inappropriately bunch up on one side of the shade tube 10 (e.g., due to an uneven mounting or an uneven force on one side of the shade), or detach from the shade tube 10. Additionally, a batten 20 or hembar 15 may detach or exit from its fabric pocket in the window shade fabric 5, and impact the brackets 50, wall or other components. A drive wheel 30, collar 35, idle end bearing, center support, multi-band connector or multi-band angled connector may loosen or experience wear. A bracket 50 may loosen, experience wear or disengage from a mounting. The accelerometer 65 may detect the excess vibration in the system (beyond the determined baseline vibration at the time) caused by one or more of such issues.

In various embodiments, the system may also analyze the impacts of wind pressure and wind velocity on a window shade system 100. The system may include and/or communicate with an anemometer that provides a notification to the system about high winds that are above a threshold level. Winds above such a threshold may damage, baffle or otherwise distort the window shade fabric 5 (e.g., mainly outdoor window shade fabric 5) or the other components. The anemometer may be located on the window shade system 100, near the window shade system 100 or remote from the window shade system 100. In response to such notification, the window shade fabric 5 can be retracted during or even before the high winds hit the window shade (e.g., a remote or nearby anemometer may send a notification to the system that the high winds may hit the area soon).

In various embodiments, the system may also incorporate a current detector to measure current draw in the circuitry of the system. The system may determine a potential problem exists if the current deviates from the expected current draw. For example, a motor 25 may be expected to draw 1 amp of current, but the system may determine that the motor 25 is now drawing 1.3 amps. To measure the current draw, the system may include a resistor, inductor (transformer), and/or Hall Effect sensor (detects increase in magnetic field from increase in current draw).

Encoder 80 measures rotational movement. In various embodiments, the encoder 80 may be located on the shaft 45 end of the motor 25 and measure directly the rotation of the motor shaft 45. In this situation, the encoder may be located on the drive core of the motor and before the gear and brake stage. Alternatively, the encoder 80 may be located on the crown of the motor 25 and measure directly the rotation of the shade tube 10 and extension or retraction of the window shade 5 in a closed loop manner. The system may interpret problems based on the encoder 80 data. At times, the shaft 45 may rotate, but the tube may not rotate due to a failure in the drive wheel 30 or other areas of the drive train of the shade assembly. In addition, if the motor brake inside the gear train fails, and allows the tube to rotate even after the shaft 45 stopped rotating, then the window fabric 5 continues to do down and would be recognized by the data from the encoder 80 located on the crown of motor 25. In another instance, the window fabric 5 may fall freely even while the brake is engaged. The encoder 80 on the crown would detect the rotational movement of the shade tube 10, although the encoder 80 on the shaft may not recognize any rotation at all. Thus, in various embodiments, the encoder 80 may be positioned on the crown or in both locations to optimize the number of failure conditions the system can detect.

At times, the shaft 45 may rotate, but the fabric 5 may not move, so an encoder 80 on shaft 45 may not be as accurate as an encoder 80 in the crown area. The system may interpret problems based on the encoder 80 data. When the encoder 80 indicates that the shaft 45 stopped rotating, but the fabric 5 continues to go down, the system may conclude that a brake slippage and/or brake failure may exist. Moreover, after the motor 25 stops, the shaft 45 or shade tube 10 may continue to rotate, so the system may also determine that a faulty brake may exist. The encoder 80 may be on the drive core of the motor 25 (and before the gear and brake stage), and then the brake fails or the gears fail, so the shade tube 10 will free wheel and the window shade 5 will fall. However, the encoder 80 remains stationary, so from the point of view of the encoder 80, the window shade 5 has not moved at all.

The system may minimize or prevent further damage to any of the components. In various embodiments, the system may include a timer function that prevents the motor 25 from operating for more than a certain amount of time (e.g., 6 minutes), after the motor 25 is activated. The timer may be, for example, part of an internal circuit or a counter in a microprocessor. In various embodiments, the system may include a kill (or reset) switch 70. The switch may operate as part of a maintenance mode. The kill switch 70 may kill operation of the motor 25 and prevent any local control of the motor 25 (e.g., by an employee or maintenance person). The kill switch 70 may be located in the head of the motor 25, or remote from the system. The kill switch 70 may also prevent others from accessing the software associated with the system, entering additional code into the software and/or changing the software. In such a situation, a professional service person (e.g., from the manufacturer) may be the only person that has the capability to re-set the switch 70 to allow the motor 25 to operate again. In various embodiments, only the person that took the motor 25 off-line may be able to put the motor 25 back on-line again. The service person may need to verify that one or more components are operating properly before re-setting the switch 70. The system may include a diagnostic check that may restrict re-setting the switch 70, prior to the diagnostic check resulting in sufficient operating parameters. The kill switch 70 may also be used when servicing any of the components such as, for example, when the motor 25 has been removed from the drive bracket 50. In various embodiments, the system may include a button, code, biometric reader or keypad that must be used to re-set the switch 70 to allow the motor 25 to operate again. Such a button may require a service person to hold down the button for a certain timeframe (e.g., five seconds). The system may require two different people to enter coordinating information (or any other authentication or verification process) to re-set the switch 70 to allow the motor 25 to operate again.

In various embodiments, as mentioned, the system may provide notifications (e.g., messaging, warnings, signals, instructions and the like). Any of the communications or notices discussed herein may be communicated with any application, communication or networking protocol discussed herein or known in the art. The system may also communicate via the internet with any smart phone or app. For example, intelligent motors 25 may send a message to the network when the motors 25 have a problem, the motors 25 are experiencing a fault condition and/or the motors 25 are disabled for maintenance. In various embodiments, the system may need to detect concerns “while” the motor 25 is moving and/or “after” the motor 25 has stopped moving (e.g., by comparing the latest run with a stored sequence or even to a library of “signatures”). System may not have a signature for a particular problem, so motor 25 sends out a general warning that “something” is wrong. In various embodiments, the motor 25 may send a message to a controller that some type of problem may exist, then the controller may query the motor 25 to determine the problem. In various embodiments, the motor 25 may be able to determine the problem on its own and send a message about the problem to a controller or any other system. The motor 25 may also send a message when the motor 25 is re-powered on, and motor 25 may send out a warning that the motor 25 still has a problem. The system may prevent a separate disconnect (e.g., for building code purposes) from that which may be on the motor 25 head. The system may call for maintenance, upon detecting a potential problem. The system may alert maintenance of the specific problem, send an error code and/or indicate the specific motor 25 that has the problem. Because maintenance receives specific information, maintenance may be able to bring the correct tools and resources for handling the job.

In various embodiments, the system may also enable a better analysis of motor 25 (or other component) characteristics, and help to more specifically define the root cause of the motor 25 (or component) problem. For example, the system may more quickly service or replace the problem components, characterize the failure more precisely, better estimate the motor 25 life, track the number of cycles, track the duration of motor 25 operation, track environmental conditions when the motor 25 is operating and extend the life of the motor 25 (e.g., extend the life of the motor to 10 years, even though warranty is only 5 years).

In various embodiments, the system may perform lifestyle tracking in the motor 25, and may establish notifications (e.g., messages, alarms and/or warnings). In various embodiments, the system may include thresholds that support warranty vs lifetime. As mentioned, a motor 25 may have a 5-year warranty, but a 10-year life. These thresolds may duplicate certain variables or at least provide distinct warnings relative to warranty, extended warranty and lifetime.

Such notifications may relate to end of life for the motor 25 or other components, a threshold for the number of cycles, counting the number of cycles (e.g., a cycle may include a revolution of the shaft 45 or a cycle may include the shade being at full top to full bottom and back to full top), the number of rotations of the shaft 45, the number of operations (e.g., relay), a threshold level of operations, operating time above a maximum time threshold, thermal cut-out counter and threshold (e.g., more often sending maximum temperature warnings may indicate that the motor 25 may be getting warn down), a pocket 75 temperature above a maximum temperature counter and threshold, an interior of motor 25 having a temperature above a maximum temperature counter and threshold, an interior of motor 25 having a temperature below a minimum temperature counter and threshold, a stall counter and threshold, a power reset counter and threshold, and/or a limit reset counter and threshold.

As mentioned, preventative maintenance operating concerns may include one or more of inability to manage speed (e.g., motor 25 speed reflected by the encoder 80 count and how fast the encoder 80 is counting the rotations) within a tolerance threshold and counter, inability to stop the motor 25 within a limits threshold and counter, reset of the shade travel limits, positioning precision including the inability to stop the motor 25 on a commanded position within a limits threshold and counter (e.g., preset at 25%, but shade actually stopped at 27%), movement without a command, excessive vibration threshold and counter, average operating temperature threshold and counter, average operating time threshold and counter, and/or a maintenance mode counter.

The system may detect and analyze noise on the network. For example, the system may detect signals on the network, when such signals should not exist. A florescent light ballast may be noisy and include a high electric field. A low voltage network that is next to such a line voltage network may cause problems. For example, during the time when perimeter lighting goes on, the line voltage network is active, so the line voltage network impacts the low voltage network. Such noise also uses up bandwidth availability on the network, so the system may need to wait for the noise to dissipate. The system may also experience an unrecognized command (e.g., noise corrupts the warning signal) instance counter and threshold. Due to excessive noise, the system may experience an inability to transmit, and/or not be able to detect, its own messages on the network. The motor 25 may be stuck in an override/inhibit mode too long. Moreover, a problem with motor 25 communications may exist.

In various embodiments, the system may setup a specific pattern recognition for specific types of failures that can be detected in preventative maintenance. The failures may include, for example, a tube assembly drop from the bracket 50 (either the idle bracket or the drive bracket), the tube assembly drop from the bracket 50 and into the catch pin with a stop of the rotation, the tube assembly drop from the bracket 50 and into the catch pin with tube still rotating, the bracket 50 coming loose from mounting surface, the motor 25 rocking in the saddle, the fabric 5 being hung up, the fabric 5 slipping off, the batten 20 stiffener hitting an obstacle (e.g., bracket 50, wall or pocket 75), the hembar 15 hitting obstructions (e.g., while traveling up or down, or while in the closure, fascia or pocket 75), the drive wheel 30 coming loose, or the shade tube 10 coming off the collar 35. The system may also provide safe operation limits to prevent false alarms (e.g., guide cable, channel, maximum and minimum torque, sample multiple motors). The failures may also include wear in the center support or idle bearing assembly, squeaking in bearing assemblies (e.g., detect high frequency vibration associated with squeaking) and/or excessive wind speed or force on exterior shade using an anemometer, as discussed.

In various embodiments, the system may record and make available error logging or non-error logging. In various embodiments, error logging may include last error message and/or error message total for individual errors being welded relay, stall/overheat, leaving calibration without setting limits, press either or both motor head buttons (e.g., for over 10 seconds), up relay weld, and/or down relay weld. Up/down relay weld includes an AC motor 25 with high in-rush current, then contact on the relay gets pitted, so contact will not allow the motor 25 to stop (welded shut in one direction) during the up/down relay. In various embodiments, non-error logging may include one or more of torque (from production employee input), plant, date of production test at plant and/or motor serial number. In various embodiments, logging may include: work order number, line item number, project name and/or over limit error log count (may depend on a certain tolerance).

The system may include an improvement to an existing microprocessor, an upgraded microprocessor, and/or a dedicated microprocessor. The microprocessor may not be robust enough (e.g., not enough processing capability) to multi-task, so the microprocessor stores the sequence (problems) and waits for the motor 25 to stop before sending out the warning. Using an existing microprocessor may include limited processing capability to make decisions (at least sophisticated ones) while managing the control of the motor 25. Upgrading to an ARM processor operating at 350 MHz gives a lot of clock cycles back for processing in real time. In various embodiments, the system may store a set of data sequences after first calibration for continual reference, and degradation waveforms that get updated from time-to-time. The system may include ways of storing portions of the sequence along with analytical parameters like average deviations, max deviations, etc. to conserve memory and not have to plan to support up to 2.5 minute data sequences. For example, the system may store portions of the sequence (start, stop, middle of run) and whether this fix will need to be taken at each alignment point. For example, a start+stop sequence at top limit, bottom limit and each preset.

In various embodiments, the system may operate as a preventative maintenance feature where the system takes a stored sequence from the latest motor movement and analyzes the sequence after the motor stops running. The system may be proactive and looking for early detection of problems. Thus, the system does not need to send a notification immediately upon detecting something different or wrong, particularly while the system is in the middle of an operation. Instead, the system may see an anomaly and allow the anomaly to operate for a time period while acquiring data about the anomaly.

This disclosure incorporates by reference for all purposes the entire contents of all of the following applications. U.S. Ser. No. 15/968,564 filed on May 1, 2018 and entitled "Window shade system 100 Safety Device". U.S. Ser. No. 16/240,479 which is a continuation-in-part of U.S. Ser. No. 15/906,674 filed on Feb. 27, 2018 and entitled "Sky Camera System for Intelligent Building Control". U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control." U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." U.S. Ser. No. 14/692,868 is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System".

U.S. Ser. No. 14/692,868 is also a continuation-in-part of U.S. Ser. No. 14/461,619 filed on Aug. 18, 2014, now U.S. Pat. No. 9,360,731 entitled "Systems and Methods for Automated Control of Electrochromic Glass." U.S. Ser. No. 14/461,619 is a continuation of U.S. Ser. No. 13/656,401 filed on Oct. 19, 2012, now U.S. Pat. No. 8,836,263 entitled "Automated Shade Control in Connection With Electrochromic Glass". U.S. Ser. No. 13/656,401 is a continuation-in-part of U.S. Ser. No. 13/359,575 filed on Jan. 27, 2012, now U.S. Pat. No. 8,723,467 entitled "Automated Shade Control in Connection with Electrochromic Glass." U.S. Ser. No. 13/359,575 is a continuation-in-part of U.S. Ser. No. 13/343,912 filed on Jan. 5, 2012, now U.S. Pat. No. 8,248,014 entitled "Automated Shade Control System".

U.S. Ser. No. 13/343,912 is a continuation of U.S. Ser. No. 12/475,312 filed on May 29, 2009, now U.S. Pat. No. 8,120,292 entitled "Automated Shade Control Reflectance Module". U.S. Ser. No. 12/475,312 is a continuation-in-part of U.S. Ser. No. 12/421,410 filed on Apr. 9, 2009, now U.S. Pat. No. 8,125,172 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in-part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005, and entitled "Automated Shade Control Method and System." U.S. Ser. No. 10/906,817 is a non-provisional of U.S. Provisional No. 60/521,497 filed on May 6, 2004, and entitled "Automated Shade Control Method and System."

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like.

Terms and phrases similar to "associate" and/or "associating" may include tagging, flagging, correlating, using a look-up table or any other method or system for indicating or creating a relationship between elements. Any of the information may be distributed and/or accessed via a software enabled link, wherein the link may be sent via an email, text, post, social network input, and/or any other method known in the art.

Computer programs (also referred to as computer control logic) are stored in main memory and/or secondary memory.

Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVAR Virtual Machine running on LINUX® or WINDOWS® operating systems).

A web client includes any device or software which communicates via any network, such as, for example any device or software discussed herein. The web client may include internet browsing software installed within a computing unit or system to conduct communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. Sec, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server, any other application server components or may reside within another computing device or may take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASER by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of transactions over time, from web registrations, from social media, from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a kcy field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a “condition header,” “header,” “trailer,” or “status,” herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on status. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system or device in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. As used herein, the term “network” includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form. For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112 (f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method comprising:

determining, by one or more processors, at least one of a changed vibration amplitude, a changed vibration frequency, a changed temperature, or a changed vibration pattern of a motor, based on a second input from a first accelerometer associated with the motor at a second timeframe compared to a first timeframe; and adjusting, by the one or more processors, operating parameters of the motor to compensate for at least one of the changed vibration amplitude, the changed vibration frequency, the changed temperature, or the changed vibration pattern of the motor, wherein the adjusting the operating parameters includes reducing a temperature reading from a temperature sensor associated with the motor to compensate for extra heat from a degradation of the motor such that the one or more processors do not activate an alarm signal in response to a higher temperature resulting from the degradation of the motor.

2. The method of claim 1, further comprising determining, by the one or more processors, at least one of a base vibration amplitude, a base vibration frequency or a base vibration pattern of a motor, based on a first input from the first accelerometer associated with the motor at the first timeframe.

3. The method of claim 1, further comprising sending, by the one or more processors, a notification to a maintenance team to check components associated with at least one of the changed vibration amplitude, the changed vibration frequency, the changed temperature, or the changed vibration pattern of the motor.

4. The method of claim 1, wherein at least one of the changed vibration amplitude, the changed vibration frequency, the changed temperature, or the changed vibration pattern of the motor is caused by at least one of a loose component, a disengaged component, a misaligned component, a damaged component or a worn component.

5. The method of claim 1, wherein the motor is configured to send a warning about a problem with the motor, in response to at least one of the changed vibration amplitude, the changed vibration frequency, the changed temperature, or the changed vibration pattern of the motor.

6. The method of claim 1, wherein the first accelerometer is located in at least one of the motor or in a gear box of the motor.

7. The method of claim 1, wherein the adjusting the operating parameters occurs proactively before a failure of the motor occurs.

8. The method of claim 1, wherein the temperature sensor is an internal temperature sensor located within a gear box of the motor, and further comprising comparing, by the one or more processors, the temperature reading from the internal temperature sensor to a second temperature reading from an external temperature sensor that measures a temperature of a pocket in which the motor is located.

9. The method of claim 1, further comprising sending, by the one or more processors, a notification signal, in response to the determining at least one of the changed vibration amplitude, the changed vibration frequency or the changed vibration pattern of the motor meets a threshold.

10. The method of claim 1, further comprising sending, by the one or more processors, a notification signal with data about an impacted component, in response to the determining at least one of the changed vibration amplitude, the changed vibration frequency or the changed vibration pattern of the motor meets a threshold.

11. The method of claim 1, further comprising sending, by the one or more processors, a notification signal, in response to the adjusting the operating parameters, wherein the notification signal causes at least one of activating an alarm, providing a visual indicator, providing a signal to another system, providing a notice via a messaging system, sending a notice to a maintenance person, sending a notice to a smart phone or sending a notice to a building management system.

12. The method of claim 1, wherein the motor interfaces with a window shade tube that is part of a window shade system.

13. The method of claim 1, further comprising receiving, by the one or more processors, data from a second accelerometer that obtains data from at least one of a hembar, a batten, a drive train or an obstacle of a window shade system.

14. The method of claim 1, further comprising receiving, by the one or more processors, seismic activity data from the first accelerometer.

15. The method of claim 1, further comprising receiving, by the one or more processors, hembar data from a second accelerometer at least one of on a hembar or within the hembar.

16. The method of claim 1, wherein the changed vibration frequency is in response to squeaking of a component.

17. The method of claim 1, further comprising receiving, by the one or more processors, vibration data from an environment around the window shade system.

18. An article of manufacture including one or more non-transitory, tangible computer readable storage mediums having instructions stored thereon that, in response to execution by one or more processors, cause the one or more processors to perform operations comprising:

determining, by the one or more processors, at least one of a changed vibration amplitude, a changed vibration frequency or a changed vibration pattern of a motor, based on a second input from a first accelerometer associated with the motor at a second timeframe compared to a first timeframe; and adjusting, by the one or more processors, operating parameters of the motor to compensate for at least one of the changed vibration amplitude, the changed vibration frequency or the changed vibration pattern of the motor, wherein the adjusting the operating parameters includes reducing a temperature reading from a temperature sensor associated with the motor to compensate for extra heat from a degradation of the motor such that the one or more processors do not activate an alarm signal in response to a higher temperature resulting from the degradation of the motor.

19. A system comprising:

one or more processors; and one or more tangible, non-transitory memories configured to communicate with the one or more processors, the one or more tangible, non-transitory memories having instructions stored thereon that, in response to execution by the one or more processors, cause the one or more processors to perform operations comprising:

determining, by the one or more processors, at least one of a changed vibration amplitude, a changed vibration frequency or a changed vibration pattern of a motor, based on a second input from a first accelerometer associated with the motor at a second timeframe compared to a first timeframe; and adjusting, by the one or more processors, operating parameters of the motor to compensate for at least one of the changed vibration amplitude, the changed vibration frequency or the changed vibration pattern of the motor, wherein the adjusting the operating parameters includes reducing a temperature reading from a temperature sensor associated with the motor to compensate for extra heat from a degradation of the motor such that the one or more processors do not activate an alarm signal in response to a higher temperature resulting from the degradation of the motor.

* * * * *